Feb. 6, 1923.
F. C. HALL
METHOD OF RUBBERIZING FABRIC
Filed Oct. 7, 1921
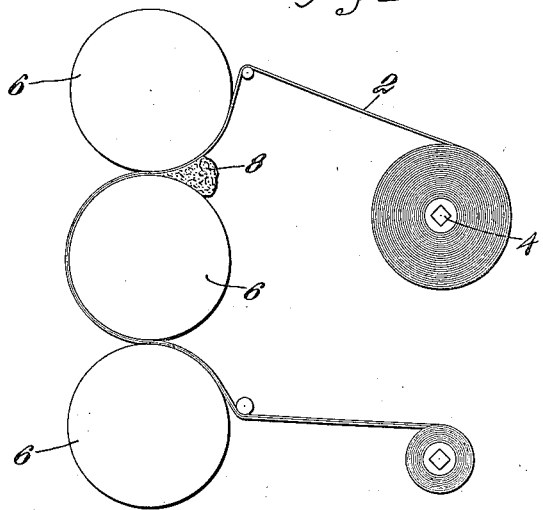
Fig. 1.
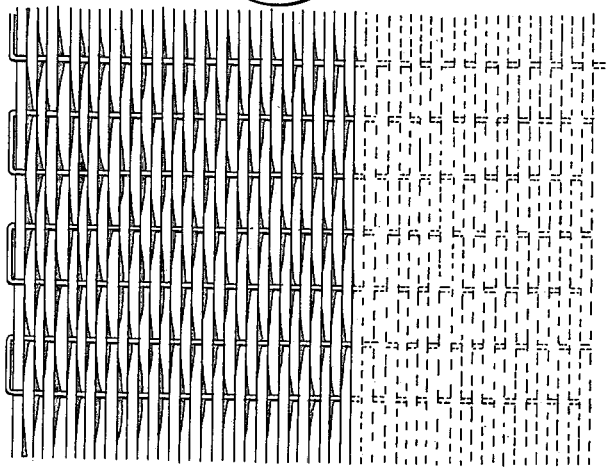
Fig. 2.
Fig. 3.
Fig. 4.
Witness:
Alfred H. McGlinchey.
Inventor:
Frederick C. Hall
by
Van Everen Fish Hildreth & Cary
Attys Patented Feb. 6, 1923.

1,444,459

UNITED STATES PATENT OFFICE.

FREDERICK C. HALL, OF PAWTUCKET, RHODE ISLAND, ASSIGNOR TO JENCKES SPINNING COMPANY, OF PAWTUCKET, RHODE ISLAND, A CORPORATION OF RHODE ISLAND.

METHOD OF RUBBERIZING FABRIC.

Application filed October 7, 1921. Serial No. 506,097.

*To all whom it may concern:*

Be it known that I, FREDERICK C. HALL, a citizen of the United States, residing at Pawtucket, in the county of Providence and State of Rhode Island, have invented certain new and useful Improvements in Methods of Rubberizing Fabric; and I do hereby declare the following to be a full, clear, and exact description of the invention such as will enable others skilled in the art to which it appertains to make and use the same.

The invention relates to the manufacture of rubberized cord fabric such as is used in the manufacture of cord tires.

Cord tire fabric, before it is rubberized, consists of a web of comparatively heavy warp threads or cords bound together by very fine and weak filling threads which are widely separated and serve merely to retain the cords in close parallel relation.

In rubberizing this fabric preparatory to incorporating it in tires it is subjected to the action of heavy calender rolls to which it is fed under heavy tension. Owing to the weakness and wide spacing of the fine filling threads the action of the rolls will cause any comparatively loose cords or series of cords to creep along the fabric and bank up at the point where the fabric enters the rolls until sufficient slack accumulates to form a fold which will enter the rolls and cause a rupture of the fabric at this point. Comparatively slack cords or zones of slack cords in the fabric are therefore highly objectionable. While slackness or under tension of the cords is objectionable in any part of the fabric leading to the rolls it is more serious toward the center than at the edges, since the center is better adapted to distribute and withstand the extra strain to which those parts of the fabric in which the tension of the cords is up to standard are necessarily subjected in case of slackness in other parts of the fabric.

It has accordingly been the aim of tire manufacturers to maintain an equal and substantially uniform tension on all of the cords leading to the calender rolls and to secure this condition the manufacturers of cord tire fabric have striven with varying degrees of success to weave a fabric in which the cords shall be under the same uniform tension throughout the width of the fabric. I have discovered, however, that the equal tension on the cords heretofore striven for is not the tension which is best suited to the efficient and economical production of rubberized cord fabric. I have found that the process may be greatly improved and the waste of fabric during the process reduced or eliminated by so distributing the tension or pull on the cords leading to the calender rolls that the cords in the center portion of the fabric are tighter or under greater tension than the cords in the edge portions. I have also found that the best results are secured if there is a slight progressive increase in the tension on the cords from each edge toward the center. The tension on the cords leading to the calender rolls may be thus distributed and maintained during the rubberizing of the fabric with the usual construction of tire calender, provided the fabric wound on the supply roll is woven with a tight center due to a slight progressive increase in the tension of the cords from each edge toward the center, as fully described in my application No. 453,509, filed March 18, 1921. I prefer, therefore, to utilize this fabric in controlling the tension on the cords leading to the calender roll. When a fabric of this character is led from the supply roll to the rubberizing calender rolls under a slight tension the center of the fabric will become taut, while there will be a slight and gradual droop or ruffling toward the edges of the fabric due to the fact that the cords in the edge portions are somewhat longer than the cords in the center portion of the fabric. Upon an increase in the tension, however, this will disappear and the fabric will lie flat and taut from side to side and will run uniformly and smoothly to the rolls. Owing to the tight center and the decrease in the tension of the cords toward each edge the strain on the fabric due to the tension under which it is fed to the rolls is so distributed across the fabric that the greater strain comes on the stronger center while the least strain comes on the weaker edges. The fabric may, therefore, not only be maintained in a smooth flat condition with less tension than heretofore but the danger of breaking the cords at the edges and thus causing the fabric to tear across is practically eliminated.

The method is illustrated in the drawings in which Fig. 1 is a diagrammatic view of a rubberizing calender, Fig. 2 is a diagrammatic view of the fabric of application No.

453,509, and Figs. 3 and 4 are diagrammatic lengthwise sections through the edge and through the center portion of the fabric.

As indicated diagrammatically in Figs. 2, 3 and 4 of the drawings the cords in the edge portions of the tight center fabric 2 are greater in lengths than the cords in the center portion, the lengths of the cords gradually decreasing from the edges toward the center. This fabric may be led from the supply roll spindle 4 to the roll 6 of the calender which applies the rubber compound thereto in the usual manner as indicated in Fig. 1. The tension on the cords may be regulated by adjusting the usual friction brakes which resist the rotation of the supply roll. Owing to the manner in which the tight center fabric was woven, that is, with a progressive increase in the tension on the cords from the edges toward the center the frictional resistance to the rotation of the supply roll will maintain a like tension on the cords as they lead from the supply roll to the calendar rolls during the rubberizing of the fabric with the advantageous results already explained.

What is claimed is:

1. The process of rubberizing cord tire fabric which consists in leading a web of closely arranged parallel cords through rubberizing calender rolls while maintaining a tension on the cords which progressively increases from the edges of the web toward the center.

2. The process of rubberizing cord tire fabric which consists in leading a web of closely arranged parallel cords through rubberizing calender rolls while maintaining the cords in the center portion of the web under greater tension than the cords in the edge portions.

3. The process of rubberizing cord tire fabric which consists in leading through rubberizing calender rolls a cord fabric having cords of greater length in the edge portions than in the center portion and maintaining sufficient tension on the fabric to keep all the cords taut as they enter the calender rolls.

4. The process of rubberizing cord tire fabric which consists in leading through rubberizing calender rolls a cord fabric having cords which gradually diminish in length from the edges toward the center portion and maintaining sufficient tension on the fabric to keep all the cords taut as they enter the calender rolls.

FREDERICK C. HALL.